(12) United States Patent
Tafoya

(10) Patent No.: US 7,546,841 B2
(45) Date of Patent: Jun. 16, 2009

(54) APPARATUS AND METHOD OF REMOVING WATER SOLUBLE SUPPORT MATERIAL FROM A RAPID PROTOTYPE PART

(76) Inventor: David Jonathan Tafoya, 13322 86th Ave. North, Maple Grove, MN (US) 55369

( * ) Notice: Subject to any disclaimer, the term of this patent is extended or adjusted under 35 U.S.C. 154(b) by 659 days.

(21) Appl. No.: 10/991,679

(22) Filed: Nov. 18, 2004

(65) Prior Publication Data
US 2005/0103360 A1    May 19, 2005

Related U.S. Application Data

(60) Provisional application No. 60/523,776, filed on Nov. 19, 2003.

(51) Int. Cl.
*B08B 3/02* (2006.01)
*B08B 3/08* (2006.01)
(52) U.S. Cl. .............. 134/106; 134/108; 134/110; 134/113; 134/198; 134/200
(58) Field of Classification Search ............ 134/108, 134/113, 184, 186, 106, 110, 200
See application file for complete search history.

(56) References Cited

U.S. PATENT DOCUMENTS

| | | | | |
|---|---|---|---|---|
| 4,286,542 A | * | 9/1981 | Belcher et al. | 118/423 |
| 4,474,198 A | * | 10/1984 | Greenfield et al. | 134/60 |
| 5,002,318 A | * | 3/1991 | Witter | 285/302 |
| 6,109,277 A | * | 8/2000 | Linton et al. | 134/56 R |
| 6,119,706 A | * | 9/2000 | Foederl et al. | 134/76 |
| 6,279,587 B1 | * | 8/2001 | Yamamoto | 134/57 R |

* cited by examiner

*Primary Examiner*—Michael Barr
*Assistant Examiner*—Saeed T Chaudhry
(74) *Attorney, Agent, or Firm*—Michael A. Mochinski

(57) ABSTRACT

The support removal apparatus comprising in combination a retention tank having a manifold assembly comprising a plurality of nozzle heads in hydraulic communication with the discharge side of a pump, collectively configured for agitating an aqueous cleaning solution comprised of sodium or potassium hydroxide, sodium or potassium carbonate, and water; a heating element mounted within the retention tank for heating the aqueous cleaning solution to a predetermined temperature set point; a basket strainer mounted within the retention tank in hydraulic communication with the intake side of the pump to mitigate passage of small rapid prototype parts and residual support material therethrough and into the pump and manifold assembly; a work surface mounted atop the retention tank and having a movable lid fitted with a basket for containing small rapid prototype parts; a thermocouple for maintaining the temperature within a tolerable range for optimum removal of support material; a level indicator to ensure adequate solution level in the retention tank for operability of the pump and heating element; a cabinet having interface controller mounted on an exterior panel thereof for setting timer and heat functions; and a microprocessor having capabilities for making minute adjustments to the heating element via feedback from the thermocouple and controlling operation of the pump and heating element for a pre-set time interval.

25 Claims, 9 Drawing Sheets

APPARATUS AND METHOD OF REMOVING WATER SOLUBLE SUPPORT MATERIAL FROM A RAPID PROTOTYPE PART

CROSS-REFERENCE TO RELATED APPLICATIONS

This application claims the benefit of priority from U.S. Provisional Application Ser. No. 60/523,776 filed Nov. 19, 2003, entitled "Apparatus and Method of Removing Water Soluble Support Material from a Rapid Prototype Part," the disclosures of which, including all attached documents, are incorporated herein by reference in their entirety for all purposes.

FIELD OF THE INVENTION

The present invention relates in general to an improved apparatus and method of removing water soluble support material from a rapid prototype part. More particularly, the present invention relates to an improved apparatus comprising means for heating and agitating an aqueous cleaning solution for accelerated, efficient dissolving of temporary support material generally utilized in the production of rapid prototype parts.

BACKGROUND OF THE INVENTION

Fused Deposition Modeling (FDM) is one method among a few capable of developing rapid prototype parts or functional models from a thermoplastic material such as ABS (acrylonitrile butadiene styrene) and polycarbonate. FDM utilizes a computer numeric controlled (CNC) extruder-head which squeezes a fine filament of melted thermoplastic through a modeler nozzle. The controller, operating in accord with pre-select, known variables, activates the modeler nozzle to deposit heated plastic layer-by-layer to form the desired geometric shape. In some instances where select features of the part are left unsupported as a result of the part's orientation, the FDM-based machine may incorporate the use of a second nozzle for extruding therethrough support material to create support structures for any cantilevered portions of the part. In cases where the part's build comprises small, intricate features, a water soluble support material may be used to further facilitate or ease removal from the part's build upon completion. Once the appropriate supporting layer is built, thermoplastic, as discussed above, is extruded through the modeler nozzle to form the part's build. Once the part has finished its successive layers and the build is complete, the part is removed from the FDM-based machine for inspection and final surface preparation, which may include removal of any support material, additional machining, and/or application of a finish coating material.

In instances where a water soluble support material is used, the art offers a range of techniques for removing the support material from the rapid prototype part. One such technique may simply involve immersing the part in a suitable solvent repeatedly via manual or automated means and manually removing the support material using a brush or a pointed tool. Another technique commonly employed in the art may involve placement within a conventional immersion parts washer of the type generally designed to remove grease, carbon, resins, tar, and other unwanted petroleum-based residuals from automotive parts and machine shop equipment. Typically, the conventional immersion parts washer of this type may comprise operable features of ultrasonics to facilitate the cleansing action of the solvent. Although the operable feature noted above may or may not adequately address the removal of support material, the conventional immersion parts washer can be costly in terms of purchase, maintenance and operation, particularly for this limited purpose, and inappropriate in a variety of environmental settings. Given that most machinery having rapid prototype part making capabilities is operated from within an office setting or a similarly suited environment, the coinciding use of a conventional immersion parts washer makes it unacceptable and inappropriate in maintaining a sound, clean environment. Further, some conventional immersion parts washer may expose one to unacceptable health risks, particularly those having ultrasonic capabilities (see World Health Organization Report on Ultrasound and Ultrasonic Noise, Geneva 1982).

Accordingly, there remains a need for a dedicated apparatus capable of removing water soluble support material from a rapid prototype part and operating side-by-side with a rapid prototype part making machine commonly placed and operated in an office setting or a similarly suited environment.

BRIEF SUMMARY OF THE INVENTION

In order to overcome the numerous drawbacks apparent in the prior art, an improved support material removal apparatus has been devised for use with a rapid prototype part making machine, specifically of the type having Fused Deposition Modeling (FDM) capabilities.

It is thus an object of the present invention to provide a low cost, non-complicated support material removal apparatus which may be reliably used in lieu of a conventional immersion parts washer dedicated and known in the art to remove grease, carbon, resins, tar, and other unwanted residuals from automotive parts and machine shop equipment.

It is another object of the present invention to provide such a support material removal apparatus which incorporates means for heating and agitating an aqueous cleaning solution for accelerated, efficient dissolving of support material generally utilized in the production of rapid prototype parts.

It is another object of the present invention to provide such a support material removal apparatus which possesses a minimal number of operating components to ensure sustained, reliable operation throughout its duration of use.

It is yet another object of the present invention to provide such a support material removal apparatus which is portable and operable independent of a rapid prototype part making machine.

It is yet another object of the present invention to provide such a support material removal apparatus which comprises process controller means for setting applicable set points for unattended operation.

It is yet another object of the present invention to provide such a support material removal apparatus which accommodates a variety of part shapes and sizes to afford versatility and flexibility to the operator in removing support material from rapid prototype parts and the like having unique geometric profiles.

It is yet another object of the present invention to provide such a support material removal apparatus which can be accommodated within the spatial requirements or foot print of most equipment generally observed and used in an office setting.

It is yet another object of the present invention to provide such a support material removal apparatus which is readily accessible for purposes of setup and adjustment and maintenance and repair without sustaining substantial operating downtimes.

It is yet another object of the present invention to provide such a support material removal apparatus which accomplishes the foregoing and other objects and advantages and which is economical, durable, and fully effective in performing its intended functions.

In accordance with the present invention, a support material removal apparatus has been devised for use with a rapid prototype part making machine, the apparatus comprising in combination a retention tank having a manifold assembly comprising a plurality of nozzle heads in hydraulic communication with the discharge side of a pump, collectively configured for agitating an aqueous cleaning solution comprised of sodium or potassium hydroxide, sodium or potassium carbonate, and water; a heating element mounted within the retention tank for heating the aqueous cleaning solution to a predetermined temperature set point; a basket strainer mounted within the retention tank in hydraulic communication with the intake side of the pump to mitigate passage of small rapid prototype parts and residual support material therethrough and into the pump and manifold assembly; a work surface mounted atop the retention tank and having a movable lid fitted with a basket for containing small rapid prototype parts; a thermocouple for maintaining the temperature within a tolerable range for optimum removal of support material; a level indicator to ensure adequate solution level in the retention tank for operability of the pump and heating element; a cabinet having interface controller mounted on an exterior panel thereof for setting timer and heat functions; and a microprocessor having capabilities for making minute adjustments to the heating element via feedback from the thermocouple and controlling operation of the pump and heating element for a pre-set time interval.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for removing water soluble supports from a rapid prototype part produced from a rapid prototype part making machine such as those that incorporate Fused Deposition Modeling (FDM) technology.

Referring now to FIGS. 1-5, there is shown generally at 10 a support removal apparatus comprising a tank assembly 12 having means for heating and agitating an aqueous cleaning solution and a cabinet 14 having an interface controller 16 mounted on an exterior panel 18 thereof for temporally controlling heat and agitation outputs. The aqueous cleaning solution most suited for this application comprises a mixture of 25-70 weight percent sodium or potassium hydroxide and 5-30 weight percent sodium or potassium carbonate, collectively forming a granular sodium or potassium composition suitable for mixing with water. Preferably, the aqueous cleaning solution comprises a concentration ratio of 1.05 pounds of granular sodium or potassium composition per one gallon of water suitably serves in removing water soluble support material from rapid prototype parts within a tolerable temperature range noted hereinafter.

Figure 2:
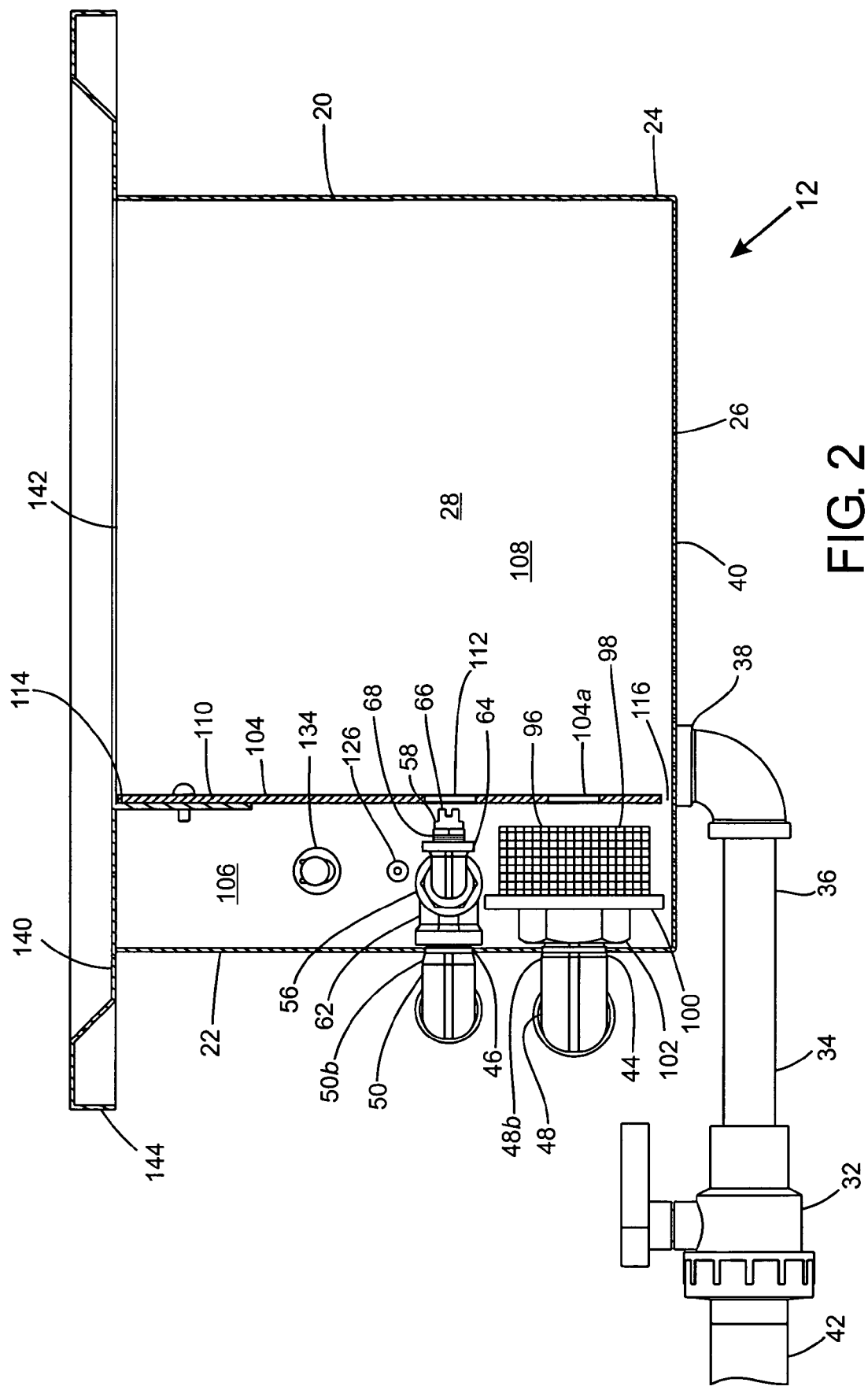
FIG. 2 is a side cross sectional view of the preferred embodiment of the present invention taken on line 2-2 of FIG. 3 illustrating a manifold assembly and strainer basket situated within an interior chamber.
Figure 3:
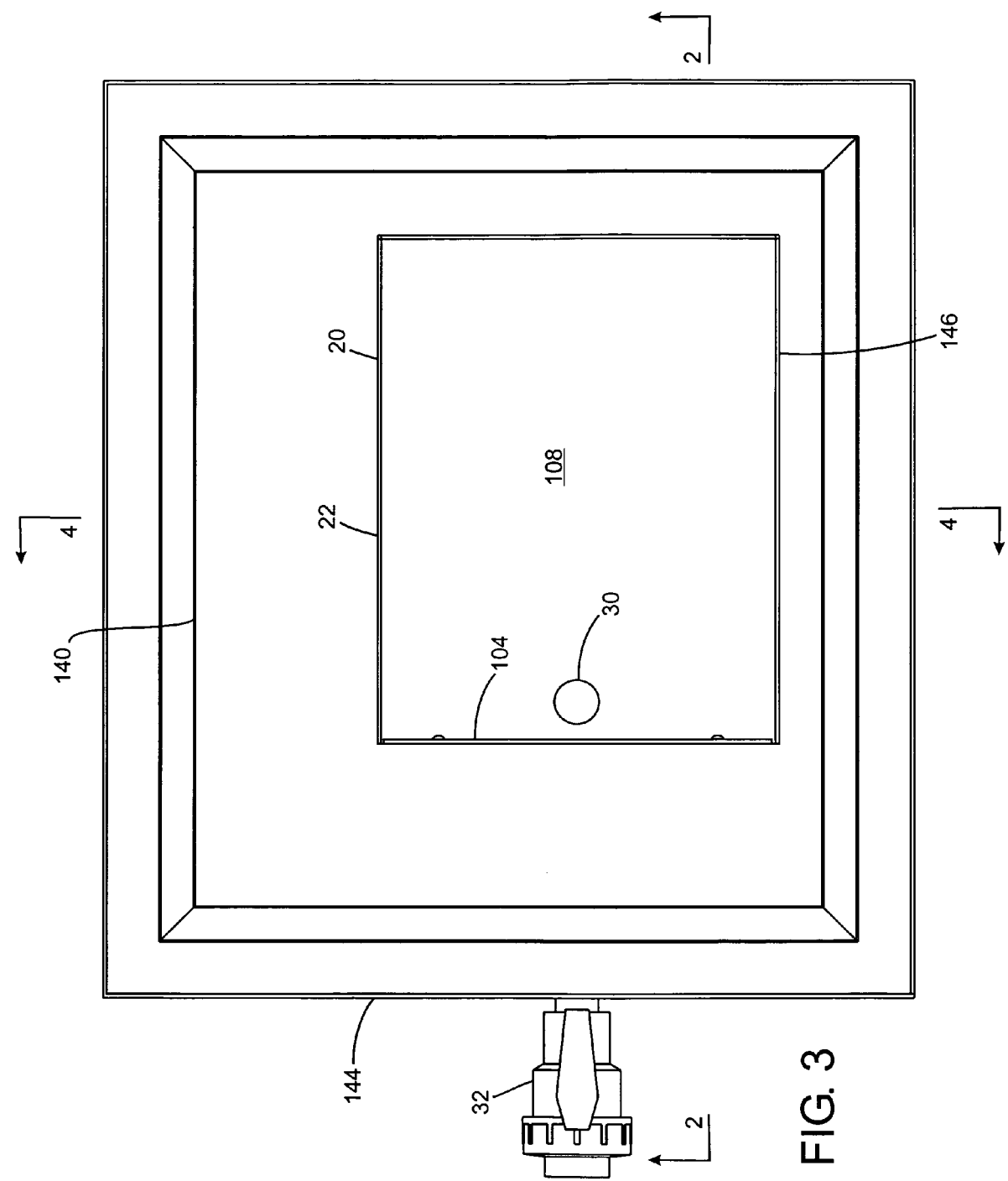
FIG. 3 is a top view of the preferred embodiment of the present invention illustrating a work surface mounted to a retention tank.

The tank assembly 12, as shown in FIGS. 2 and 3, comprises a retention tank 20 having four side walls 22 substantially arranged and connected to one another to form a box-like structure having a bottom leading edge 24 fixedly attached to and along the perimeter of a base 26, collectively forming an interior chamber 28 for containing and holding the aqueous cleaning solution. In the preferred embodiment, an aperture 30 extending through the base primarily serves as means for removing aqueous cleaning solution from the interior chamber for purposes of repair and maintenance and like activities. Retention of aqueous cleaning solution in the interior chamber 28 as well as removal therefrom and through the aperture is principally controlled by a valve 32 connected in line to a drain pipe 34 having an input end 36 threadably connected to a drain sleeve 38 mounted to and over the aperture at an exterior side 40 of the base and an output end 42 terminating at an external waste line or sump collector.

Figure 1:
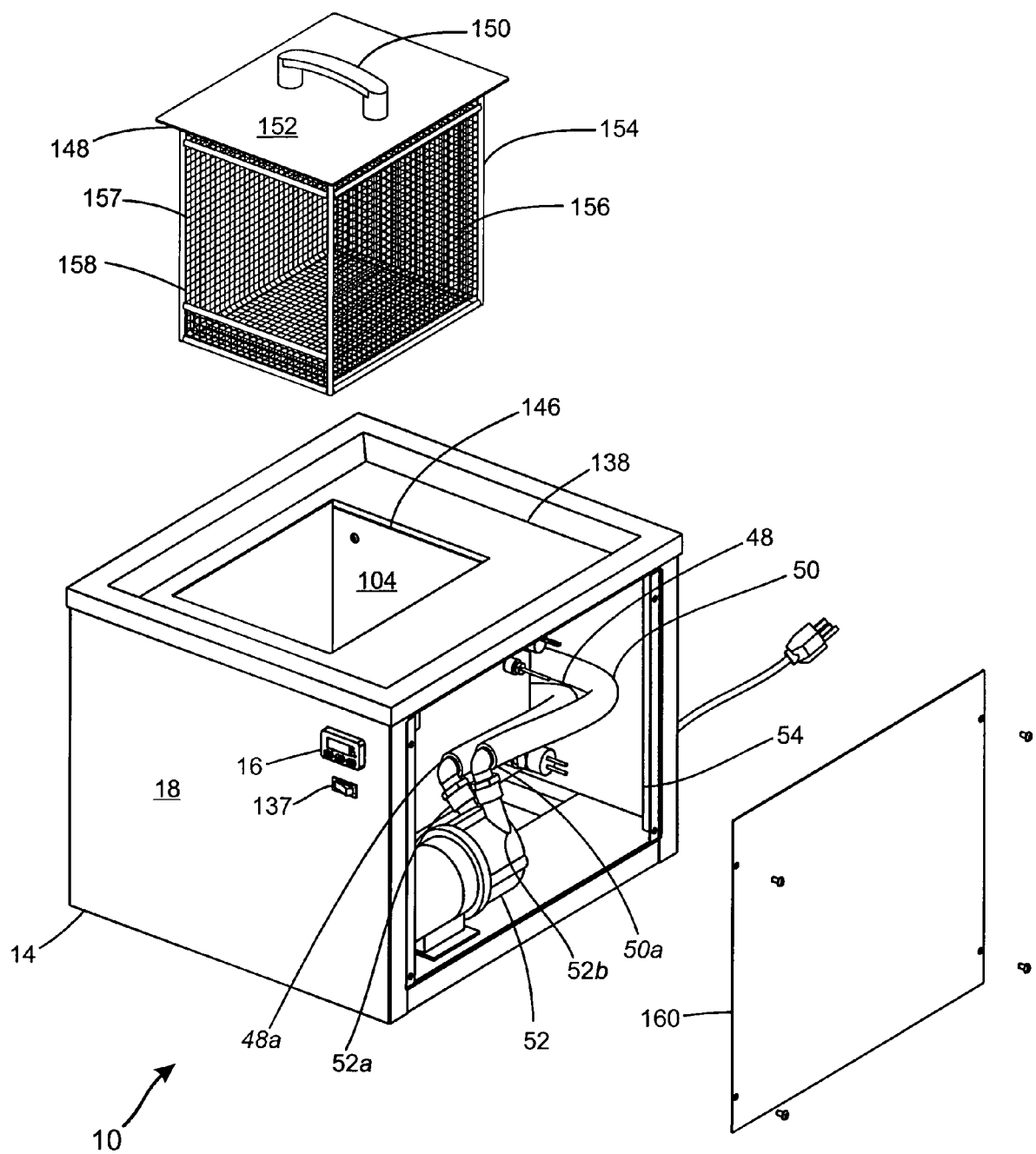
FIG. 1 is a perspective view of the preferred embodiment of the present invention illustrating a support removal apparatus equipped with a basket.
Figure 4:
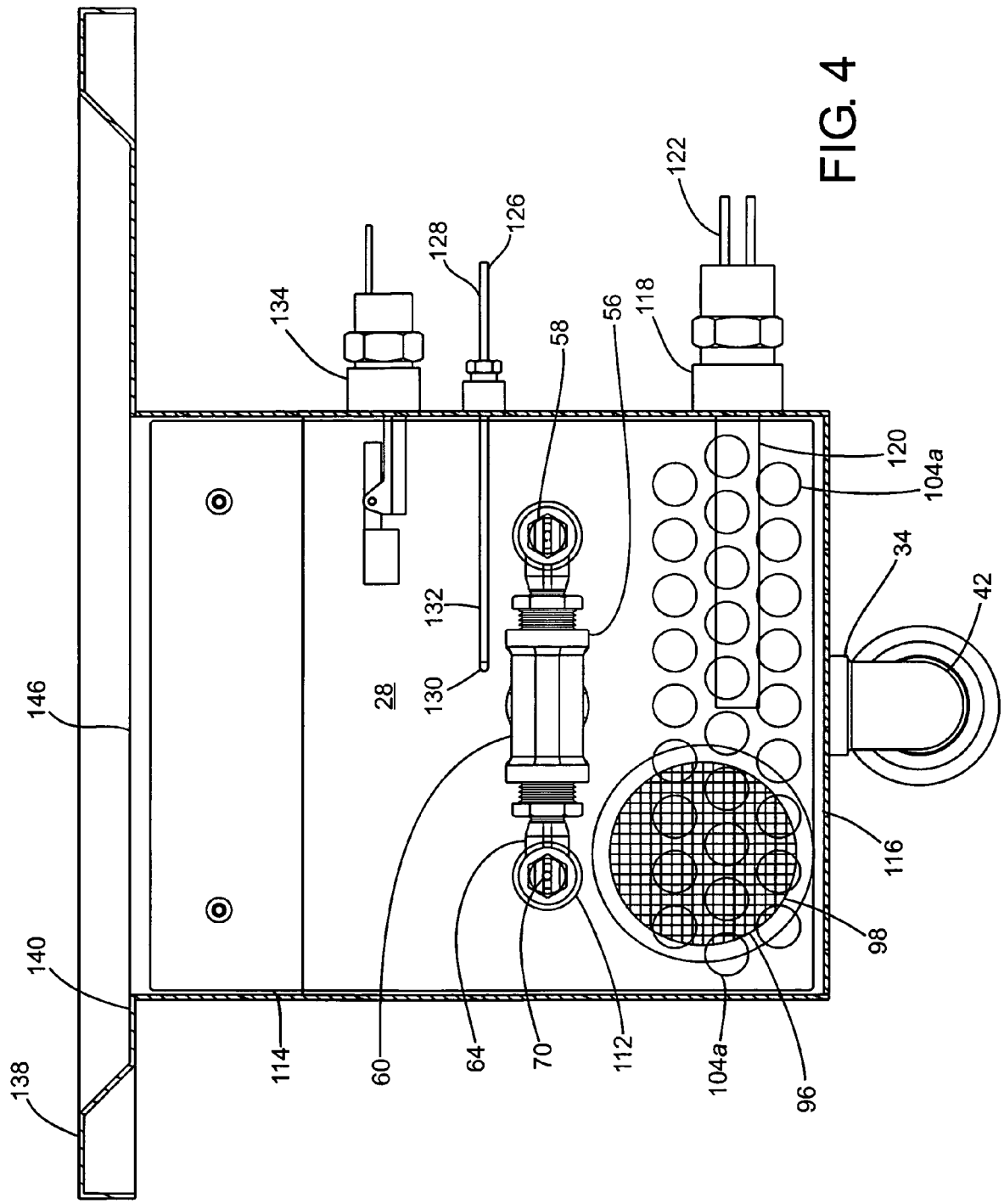
FIG. 4 is a side cross sectional view of the preferred embodiment of the present invention taken on line 4-4 of FIG. 3 illustrating a strainer basket and a manifold assembly.
Figure 6:
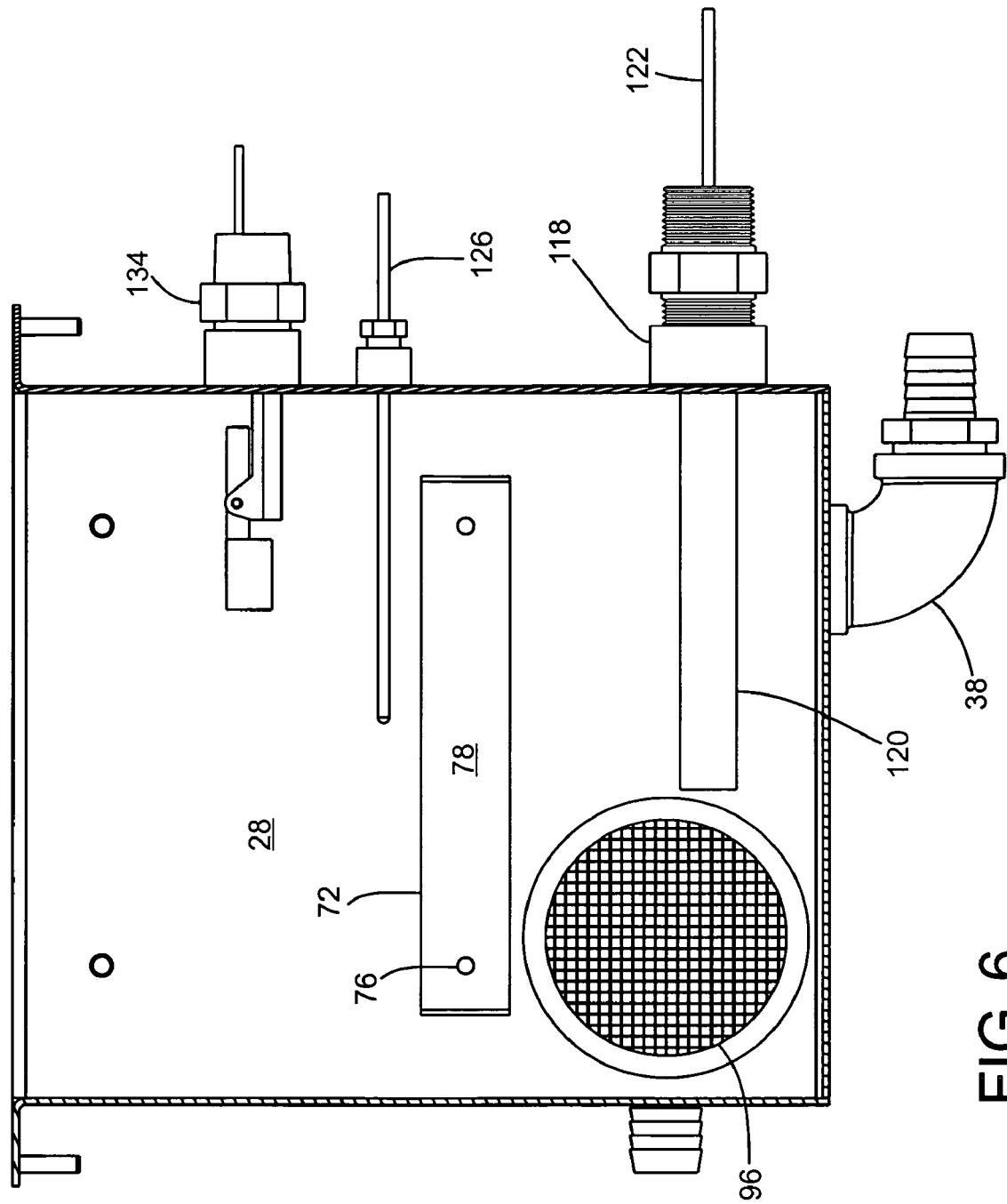
FIG. 6 is a side cross sectional view of the preferred embodiment of the present invention illustrating an alternative manifold assembly having an elongate tubular member.
Figure 7:
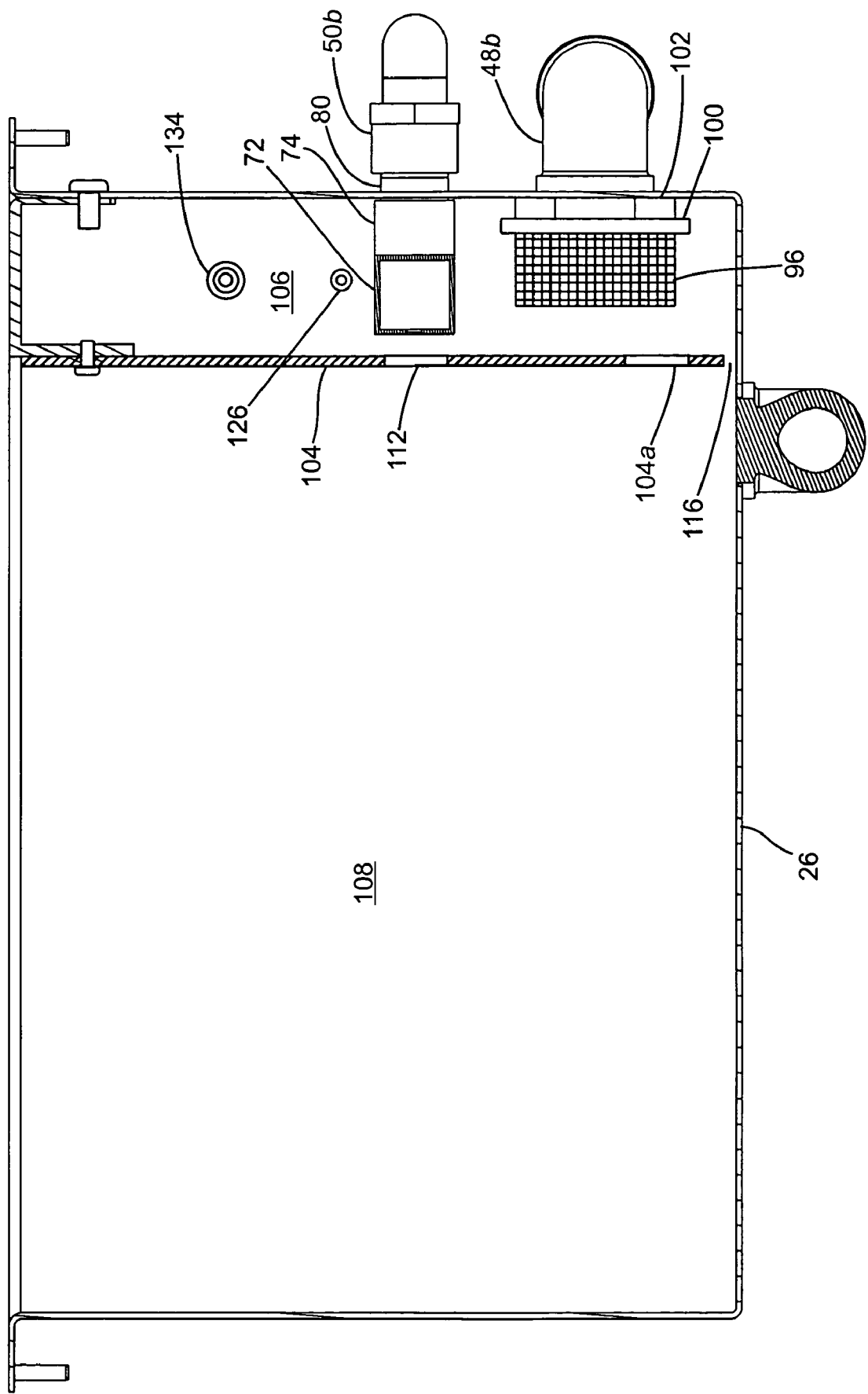
FIG. 7 is a side cross sectional view of the preferred embodiment of the present invention illustrating an alternative manifold assembly having an elongate tubular member connected to an inlet fitting.
Figure 8:
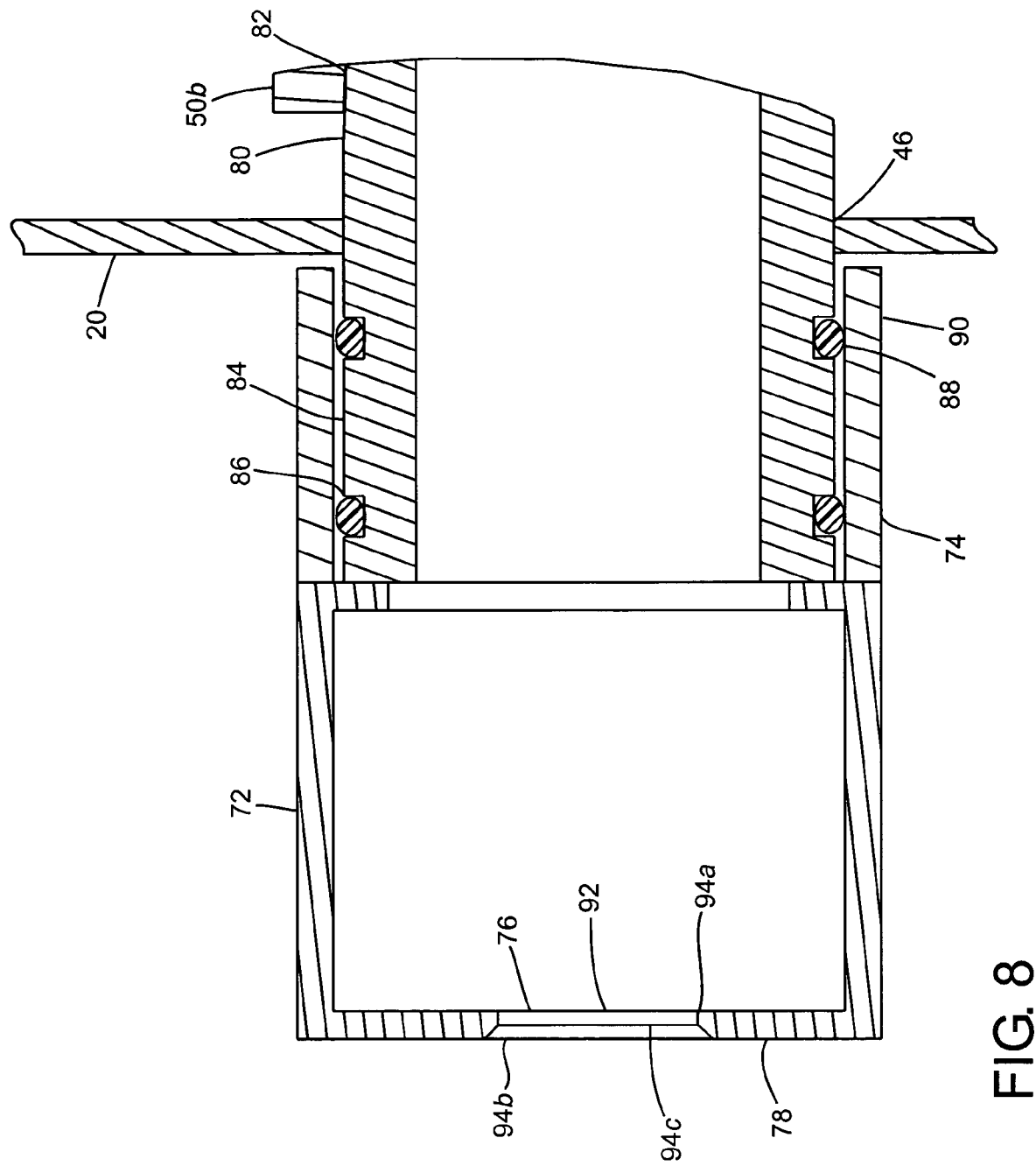
FIG. 8 is a partial side cross sectional view of the preferred embodiment of the present invention illustrating an elongate tubular member connected to a second end of an outlet piping.

As shown in FIGS. 1 and 2, one side wall 22 of the retention tank preferably comprises intake and outlet apertures 44, 46 for passage of intake and outlet piping 48, 50, respectively, each having first ends 48a, 50a attached to intake and outlet sides 52a, 52b of a pump 52 mounted exterior to the retention tank and housed within an interior portion 54 of the cabinet. Pumps most suited for this application comprise of types having centrifugal or magnetic operable means, to name a couple known in the art to possess favorable characteristics to hydraulically convey and circulate aqueous cleaning solution in and through the retention tank 20. However, regardless of the pump type used, pump seals as well as other operable components thereof are preferably fabricated from materials which are compatible for use in a corrosive, caustic environment given the alkalinity of the aqueous cleaning solution. Accordingly, seals made from ethylene propylene diene monomer (EPDM) or Viton™ and metallic components made from stainless steel tolerably perform well within the predetermined range of operation (temperature and pH) without deleterious impact to pump performance. As depicted in FIG. 2, a second end 50b of the outlet piping 50 is adaptably mounted to a manifold assembly 56 principally serving as means for agitating the aqueous cleaning solution contained within the retention tank. Preferably, the manifold assembly is housed within a portion of the interior chamber 28 and comprises at least one nozzle head 58 threadably mounted to the second end of the outlet piping. In an alternative arrangement, one of which utilizes more than one nozzle head, the manifold assembly comprises a pipe tree fitting 60 having a feed end 62 fixedly attached to the second end 50b of the outlet piping and more than one branch ends 64 extending therefrom to evenly distribute the incoming flow into an equivalent number of nozzle heads 58. It is noted herein that the manifold assembly 56 may comprise one or more in number with each being selectively arranged about the retention tank 20 to provide for opposing, cross interaction of flows from each nozzle head, suitably needed in some instances to achieve the desired level of agitation or turbulence within the interior chamber 28. In this alternative arrangement, the outlet piping is further divided with appropriate fittings commonly available in the art and selectively connected to a predetermined number of pipe tree fittings 60 each having multiple branch ends 64 fitted with a nozzle head 58. Each nozzle head, as best illustrated in FIGS. 2 and 4, comprises a nozzle tip 66 and a threaded body 68 threadably mounted to each branch end 64. In order to develop and continually establish a predominate level of agitation within the interior chamber, each nozzle tip is suitably configured with an orifice 70 having a diameter ranging from 0.05 to 0.375". In this diametric range combined with a pump capacity ranging from 3-30 gallons per minute at a power output ranging $\frac{1}{25}$-2 HP, each nozzle tip 66 is substantially capable of developing an output pressure ranging from 5 to 60 p.s.i., respectively. In this pressure range, each nozzle tip provides for a jet stream having a tight dispersion pattern capable of reaching and interacting with and reflecting off the opposing side wall of the retention tank 20 to uniformly agitate the aqueous cleaning solution within the interior chamber. In instances where the retention tank comprises a larger volumetric capacity, more than one manifold assembly 56, as described above, may be needed to create and maintain homogenous agitation of the aqueous cleaning solution for sustained and continued removal of support material from the rapid prototype part(s). In an alternative embodiment, the manifold assembly in lieu of the nozzle head 58 may comprise of an elongate tubular member 72 having an inlet fitting 74 hydraulically attached and extending perpendicularly thereto and a plurality of orifices 76 being positioned about an outer face 78 thereof, substantially in the manner shown in FIG. 6. Assembly of the elongate tubular member to the second end 50b of the outlet piping is accomplished by a sleeve 80 having a first end 82 fixedly attached thereto and a second end 84 having at least two concentric depressions 86 for accepting therein an equivalent number of o-rings 88. As illustrated in FIG. 8, a free end 90 of the inlet fitting 74 is slidably positioned onto and over the second end 84 and moved thereabout until the o-rings are completely encased within the inner confines of the inlet fitting. Each orifice 76 situated about the outer face 78 preferably comprise a wall 92 having a anterior portion 94a thereof extending perpendicular thereto and a posterior portion 94b extending angularly outward a predetermined amount from a midpoint position 94c in the wall, specifically where the anterior portion terminates within the confines of the wall.

As illustrated in FIG. 2, a second end 48b of the intake piping 48 comprises a basket strainer 96 having a plurality of apertures 98 extending therethrough for passage of the aqueous cleaning solution during cyclic circulation thereof while effectively eliminating the passage of small rapid prototype part(s) and residual support material suspended in solution. A backing plate 100 fixedly attached to the basket strainer and having a threaded coupling 102 fixedly attached thereto suitably serves as means for mounting the strainer basket to the second end of the intake piping, substantially in the manner shown in FIG. 2. To further mitigate undesirable interaction of small rapid prototype part(s) in suspension with the manifold assembly 56 and basket strainer, where positive and negative pressure is respectively observed, the retention tank 20 is fitted with a plate guard 104 to divide the interior chamber 28 into first and second compartments 106, 108. The plate guard preferably comprises an upper leading edge 110 and a plurality of nozzle apertures 112 extending therethrough to accommodate an equivalent number of nozzle heads 58 for sustained and continued passing of the aqueous cleaning solution into the second compartment 108 of the interior chamber 28. Mounting of the plate guard within the interior chamber is substantially accomplished by attaching the upper leading edge 110 to a portion of a work surface 114 suitably situated above and attached to the retention tank. All unattached edges of the plate guard are selectively positioned away from the side walls 22 and base a predetermined distance to form an elongate opening 116 therealong, purposefully to maintain circulation of the aqueous cleaning solution contained within the interior chamber of the retention tank. To enhance circulation of the aqueous cleaning solution to a greater extent than that provided by the elongate opening, the plate guard 104 further comprises a plurality of openings 104a collectively positioned near the bottom thereof adjacent to the base 26. Preferably each opening is sized accordingly to hinder movement of most rapid prototype part(s) from the second compartment into the first compartment, toward the basket strainer 96, predominately caused by the presence of negative pressure thereat.

Figure 9:
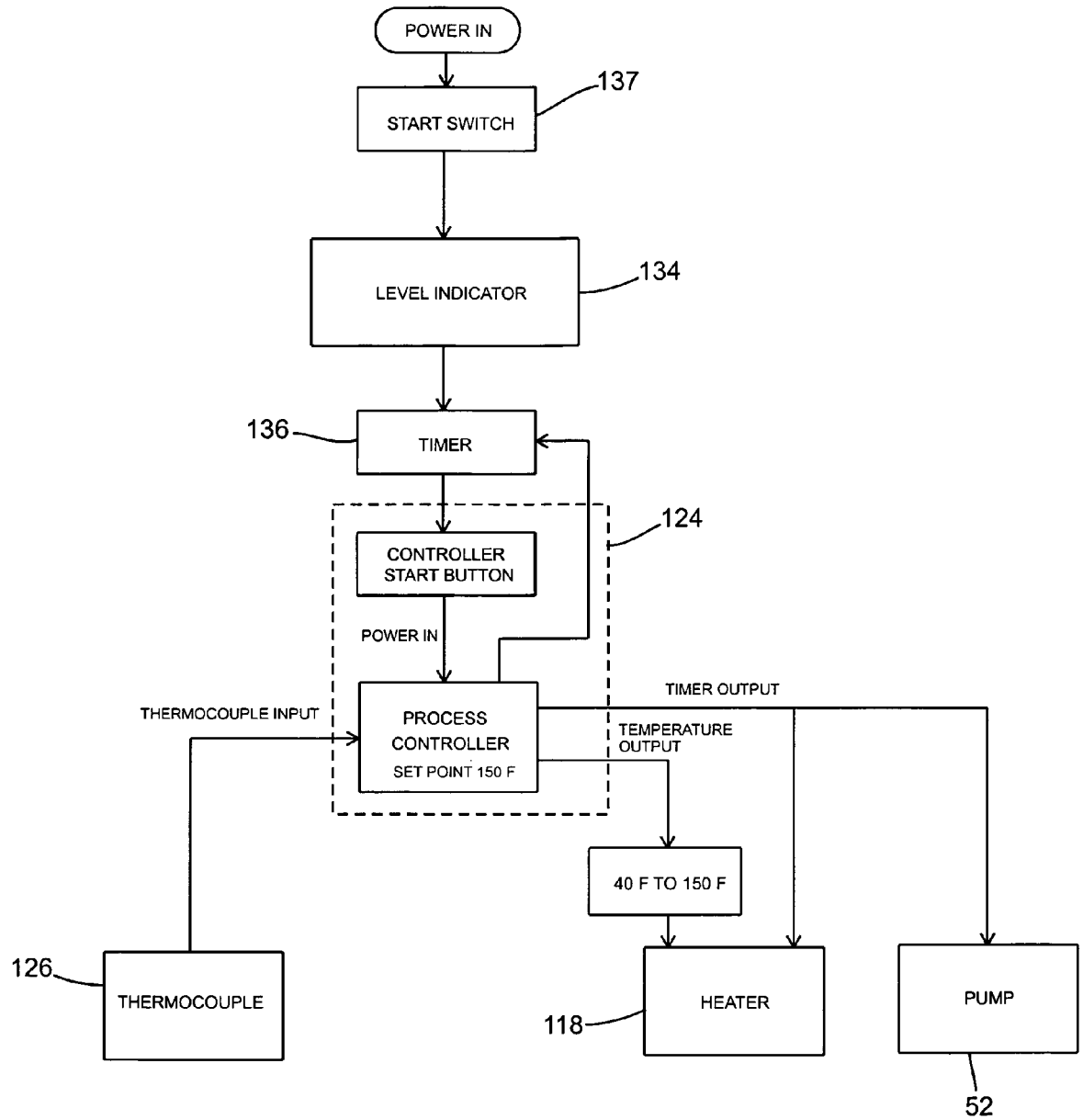
FIG. 9 is a flow diagram of the preferred embodiment of the present invention illustrating a microprocessor communicatively coupled to a thermocouple, pump, heating element, and level indicator.

To further assist the cleansing action of the aqueous cleaning solution for effective removal of support material from rapid prototype part(s), the retention tank is configurably fitted with a heating element 118 having an internal end 120 situated within the interior chamber and an external end 122 electrically connected to an output line of a microprocessor 124. As shown in FIG. 4, the heating element is mounted adjacent to the base in the first compartment 106, specifically being positioned most near the side wall where the manifold assembly 56 and basket strainer are located to facilitate distribution of heat to the aqueous cleaning solution via the pump 52 feeding solution into the first and second compartments. Although numerous types of heating elements may be suited for this application, it is preferred that the heating element 118 comprise a power rating ranging from 50-300 Watts/sq. in., a power rating of which substantially heats the aqueous cleaning solution to 90-180° F. within a modest time range of at least 15-90 minutes, respectively. The heating element may comprise a variety of geometric configurations and design features such as those having an internal end selectively shaped as a band, cable, tubular cartridge, strip, to name a few most widely known and available in the art, providing each meets the above operating specifications. It is noted herein that the present invention may alternatively comprise a heating element mounted externally to the retention tank in lieu of the heating element mounted internally in the interior chamber. In such instance, the retention tank primarily serves as a suitable conductor in transmitting heat to the aqueous cleaning solution. In similar regard in terms of substantiating the number of nozzle heads 58, a retention tank comprising a larger volumetric capacity may necessitate a heating element having a higher heatable surface area and output to maintain the overall effectiveness of the aqueous cleaning solution. Given the operating characteristics of the aqueous cleaning solution in terms alkalinity, the internal end preferably comprises a sheath fabricated from materials such as stainless steel 304 or 316, Inconel, Incoloy, Monel, or titanium, collectively of the type capable of resisting premature failure of the heating element during operative conditions. Working in conjunction with the heating element, a thermocouple 126 mounted to the retention tank 20 suitably serves as means for controlling the temperature of the aqueous cleaning solution within a tolerable range noted hereinbefore. As depicted in FIG. 4, the thermocouple comprises an external lead 128 electrically connected to the input side of the microprocessor 124 and an internal probe 130 extending inwardly within the first compartment for which is readily capable of sensing the ambient temperature of the aqueous cleaning solution and making timely and minute adjustments to the heating element 118 via the microprocessor. Like the heating element in terms of material choice, the internal end preferably comprises a sheath 132 fabricated from or coated with a material most compatible for operation in a corrosive environment. In addition to the available means for heating and agitating the aqueous cleaning solution, a level indicator 134 of the type shown in FIG. 4 provides means for activating power to the microprocessor to permit activation of a timer switch 136 which correspondingly controls the duration of operating the heating element and pump 52. Further, the level indicator suitably serves as a safety device insofar of eliminating premature activation of the pump when the interior chamber 28 is absent of aqueous cleaning solution. Level indicators comprising operable features of optics, magnetic, mechanical means, to name a few commonly available in the art, may be suited for this application providing each comprises means for connectivity to the microprocessor 124. As illustrated in FIG. 9, the microprocessor selectively controls outputs to the pump and heating element operably based on time and temperature set points established by the operator or manufacturer. In the preferred embodiment, a temperature set point of approximately 150° F., as set by the manufacturer, establishes optimal performance of the aqueous cleaning solution. Time input, on the other hand, is selectively controlled by the user via the interface controller 16 comprising means for displaying operating variables of temperature and time. An example of a suitable microprocessor for this application is the type manufactured by the Watlow Company of St. Louis, Mo., specifically being designated as Watlow Series 935B. It should be understood that many other types of microprocessors may be used in this application providing it comprises capabilities to control the desired outputs noted above. It is further understood that all electrical components described above, including the pump, heating element, thermocouple, level indicator and microprocessor, may be electrically wired in any known manner. In operation, with reference to FIG. 9, power is initially supplied to a start switch 137 which subsequently activates the level indicator 134. Upon the level indicator detecting the level of the aqueous cleaning solution in the retention tank, power is further transmitted to the microprocessor at which time the timer is activated by the operator to set the temporal limits for operating the pump 52 and heating element 118. Process startup is finally achieved by the operator activating a controller start button integrally made part of the microprocessor. It is noted herein that the heating element only operates within a temperature range of approximately 40° F. to the set point of 150° F. notwithstanding the time inputs, in contrast to the pump 52 which operates for the full duration of the time input. Upon expiration of the timer's set limits, power to the pump as well as the heating element is disabled via the microprocessor 124. Reactivation of the cleaning cycle substantially involves re-setting the timer function and activating the controller start button.

Figure 5:
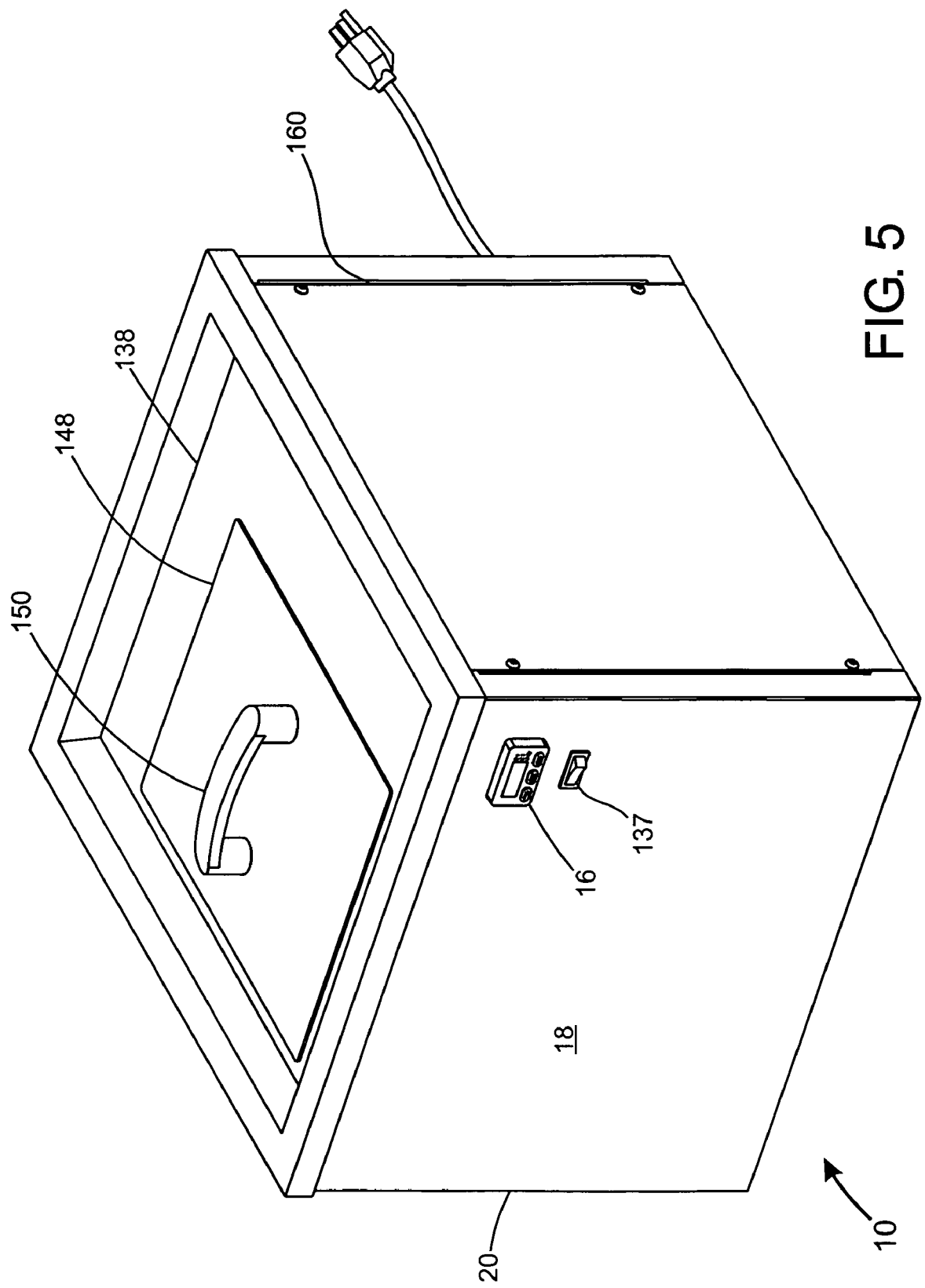
FIG. 5 is a perspective view of the preferred embodiment of the present invention illustrating a support removal apparatus equipped with a lid.

As noted above, the retention tank 20 is fitted with a work surface 138 of the type comprising a recessed portion 140 having an opening 142 extending therethrough, collectively being contained within an upper ledge 144 extending along the perimeter of the work surface. The work surface, particularly the recessed portion, primarily serves in containing and channeling the aqueous cleaning solution downwardly toward the retention tank in the event of inadvertent spillage caused by the removal of rapid prototype parts from the second compartment 108. As illustrated in FIGS. 1 and 3, the opening preferably comprises a geometric configuration and size substantially conforming to an accessible opening 146 of the second compartment. To mitigate further loss of aqueous cleaning solution, primarily due to evaporation, the work surface further comprises a lid 148 having a geometric configuration substantially conforming to the opening 142 of the recessed portion and a handle 150 fixedly attached to an upper surface 152 thereof to provide means for removing and placing the lid onto and over the accessible opening 146. In some applications, the lid, as shown in FIG. 1, is adaptably fitted with a basket 154 hanging downwardly therefrom for holding small rapid prototype parts which easily suspend in solution and readily move about the interior chamber 28. In this regard, the basket comprises perforated walls 156 substantially arranged to form an interior portion 157 capable of containing the rapid prototype parts yet permitting the passing of aqueous cleaning solution upon removal from the retention tank. Preferably, the basket 154 comprises an overall geometric configuration substantially capable of fitting within the confines of the second compartment 108 and passing unhindered through the opening 142. Access to the basket is made possible by a parts opening 158 extending through one of its perforated walls 156 and when placed within the interior chamber, the parts opening abuts up against the sidewall 22 of the retention tank to impede outgoing flow of rapid prototype parts into the interior chamber. As illustrated in FIGS. 1 and 5, the cabinet 14 further comprises features for operation and maintenance, including an access panel 160 removable therefrom to gain access to the pump 52 and other operable components and, as noted earlier, an interface controller display and the start switch 137 mounted externally on the cabinet. In most applications, the work Surface 138 is welded to the retention tank and collectively placed into and attached to the The cabinet by plurality of screws.

It can be seen from the foregoing that there is provided in accordance with this invention a simple and easily operated device, which is particularly suited to operate side-by-side with a rapid prototype parts making machine in an office setting or similarly suited environment. The support removal apparatus 10 is completely functional in removing water soluble supports most efficiently from rapid prototype parts given optimum operability in terms of aqueous cleaning solution type and concentration, agitation, and temperature.

It is obvious that the components comprising the support removal apparatus may be fabricated from a variety of materials, providing such selection or use of materials possess the capacity to withstand premature corrosion given the presence and use of an alkaline aqueous cleaning solution, notably falling within an applicable pH range of 8-11. Accordingly, it is most desirable, and therefore preferred, to construct the retention tank 20, work surface 138, lid 148 and nozzle heads 58 from 316 stainless steel; pipe and fittings from a polymeric material such as polyamide (PA) or acrylonitrile-butadiene-styrene (ABS); and cabinet 14 from a lower grade stainless steel. It is noted herein that the retention tank, nozzle head and work surface, may be alternatively fabricated from materials to lessen the overall weight of the support removal apparatus yet maintaining sufficient resistance to corrosion, such as polypropylene, polyoxymethylene, polyphenylene, ABS, or PA. Similarly, the pump, thermocouple, heating element, and level indictor, particularly exposed operable components of each, are fabricated from a high grade stainless steel (316) or coated with an impervious, corrosive-resistant material such as epoxy.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for removing water soluble support material from a rapid prototype part, said apparatus comprising in combination:

a retention tank having walls and a base collectively forming an interior chamber for containing and storing an aqueous cleaning solution, said base having an aperture extending therethrough and adaptably fitted with a valve for selectively controlling flow of the aqueous cleaning solution from said interior chamber into an external sump collector, said wall having intake and outlet apertures extending therethrough;

intake and outlet piping passing through said intake and outlet apertures of wall, said intake and outlet piping each having one end attached to intake and outlet sides of a pump and a second end attached to a basket strainer and a manifold assembly, respectively, said manifold assembly comprising a nozzle head having a nozzle tip for passing therethrough the aqueous cleaning solution into said interior chamber;

a thermocouple having an internal probe positioned internally in said interior chamber to engage the aqueous cleaning solution and an external lead communicatively coupled to a microprocessor for measuring temperature of the aqueous cleaning solution;

a heating element having an internal end positioned internally in said interior chamber to engage the aqueous cleaning solution and an external end communicatively coupled to said microprocessor for controlling heat input to the aqueous cleaning solution contained within said interior chamber;

a plate guard having an upper leading edge attached to said retention tank to structurally divide said interior chamber into first and second compartments for housing therewithin said manifold assembly, heating element and basket strainer and for receiving therewithin one or more rapid prototype parts, respectively, said plate guard having a plurality of nozzle apertures each being selectively positioned to align with said nozzle tip and a plurality of openings selectively arranged in proximity of said basket strainer and said heating element to yield effective circulation of the aqueous cleaning solution within said interior chamber for uniform heat transfer while simultaneously inhibiting the passage of rapid prototype parts into said first compartment from said second compartment;

a work surface mounted to said retention tank and having a recessed portion and an opening fitted therewithin for containing and channeling the aqueous cleaning solution back into said interior chamber; and a level indicator positioned internally in said first compartment at a predetermined distance above said nozzle head for transmitting level measurements of the aqueous cleaning solution present in said interior chamber to said microprocessor to selectively activate said heating element and said pump for a predetermined time interval as controllably maintained by a timer.

2. An apparatus as set forth in claim 1, wherein said manifold assembly comprises a pipe tree fitting having a feed end fixedly attached to said second end of outlet piping and more than one branch ends extending outwardly therefrom each being threadably fitted with said nozzle head.

3. An apparatus as set forth in claim 1, wherein the aqueous cleaning solution comprises a granular sodium composition of 25-70 weight percent sodium hydroxide and 5-30 weight percent sodium carbonate.

4. An apparatus as set forth in claim 1, wherein the aqueous cleaning solution comprises a concentration ratio of 1.05 pounds of granular sodium composition per one gallon of water.

5. An apparatus as set forth in claim 1, wherein the aqueous cleaning solution comprises a granular potassium composition of 25-70 weight percent potassium hydroxide and 5-30 weight percent potassium carbonate.

6. An apparatus as set forth in claim 1, wherein the aqueous cleaning solution comprises a concentration ratio of 1.05 pounds of granular potassium composition per one gallon of water.

7. An apparatus as set forth in claim 1, wherein said heating element comprises a power rating ranging from 50-300 Watts per square inch.

8. An apparatus as set forth in claim 1, wherein said retention tank is fabricated from stainless steel having conductive and corrosive-resisting properties.

9. An apparatus as set forth in claim 1, wherein said plate guard comprises a geometric configuration to form an elongate opening in between said walls and base of retention tank to accommodate passage of the aqueous cleaning solution into and from said first and second compartments.

10. An apparatus as set forth in claim 1, wherein said work surface further comprises a lid having a geometric configuration substantially conforming to said opening and a handle affixed to an upper surface thereof to serve as means for handling said lid during operation.

11. An apparatus as set forth in claim 10, wherein said lid further comprises a basket being attached thereto and hanging downwardly therefrom and having perforated walls to permit passage of the aqueous cleaning solution while simultaneously inhibiting the passage of rapid prototype parts and a parts opening extending through one of its perforated walls to permit unhindered observation of and access to an interior portion thereof, said basket further comprising an overall geometric configuration substantially capable of fitting through the confines of said opening for positioning within said interior chamber.

12. An apparatus as set forth in claim 1, wherein said retention tank is housed within a cabinet having an exterior panel for mounting thereon an interface controller and a start switch communicatively coupled to said microprocessor and an access panel for gaining access to said level indicator, heating element, pump, and microprocessor for repair and maintenance.

13. An apparatus as set forth in claim 1, wherein said heating element is activated for a temperature range of approximately 40° F to a set point of 150° F.

14. An apparatus for removing water soluble support material from a rapid prototype part, said apparatus comprising in combination:
- a retention tank having walls and a base collectively forming an interior chamber for containing and storing an aqueous cleaning solution, said base having an aperture extending therethrough and adaptably fitted with a valve for selectively controlling flow of the aqueous cleaning solution from said interior chamber into an external sump collector, said wall having intake and outlet apertures extending therethrough;
- intake and outlet piping passing through said intake and outlet apertures of wall, said intake and outlet piping each having one end attached to intake and outlet sides of a pump and a second end attached to a basket strainer and a manifold assembly, respectively, said manifold assembly comprising an elongate tubular member having a plurality of orifices positioned about an outer face thereof and an inlet fitting having a free end slidably positioned over a second end of a sleeve with the first end thereof being fixedly attached to said second end of outlet piping, said second end of sleeve comprising at least two concentric depressions for accepting therein an equivalent number of o-rings for tighteningly holding and sealing together said free end of inlet fitting and said second end of sleeve, each of said orifices comprising a wall having an anterior portion extending perpendicular to said outer face and a posterior portion extending angularly outward a predetermined amount from a midpoint position of said orifice wall;
- a thermocouple having an internal probe positioned internally in said interior chamber to engage the aqueous cleaning solution and an external lead coupled to a microprocessor for measuring temperature of the aqueous cleaning solution;
- a heating element having an internal end positioned internally in said interior chamber to engage the aqueous cleaning solution and an external end communicatively coupled to said microprocessor for controlling heat input to the aqueous cleaning solution contained within said interior chamber;
- a plate guard having an upper leading edge attached to said retention tank to structurally divide said interior chamber into first and second compartments for housing therewithin said manifold assembly, heating element and basket strainer and for receiving therewithin one or more rapid prototype parts, respectively, said plate guard having a plurality of nozzle apertures each being selectively positioned to align with said orifice and a plurality of openings selectively arranged in proximity of said basket strainer and said heating element to yield effective circulation of the aqueous cleaning solution within said interior chamber for uniform heat transfer while simultaneously inhibiting the passage of rapid prototype parts into said first compartment from said second compartment;
- a work surface mounted to said retention tank and having a recessed portion and an opening fitted therewithin for containing and channeling the aqueous cleaning solution back into said interior chamber; and
- a level indicator positioned internally in said first compartment at a predetermined distance above said orifice for transmitting level measurements of the aqueous cleaning solution present in said interior chamber to said microprocessor to selectively activate said heating element and said pump for a predetermined time interval as controllably maintained by a timer.

15. An apparatus as set forth in claim 14, wherein said work surface further comprises a lid having a geometric configuration substantially conforming to said opening and a handle affixed to an upper surface thereof to serve as means for handling said lid during operation.

16. An apparatus as set forth in claim 15, wherein said lid further comprises a basket being attached thereto and hanging downwardly therefrom and having perforated walls to permit passage of the aqueous cleaning solution while simultaneously inhibiting the passage of rapid prototype parts and a parts opening extending through one of its perforated walls to permit unhindered observation of and access to an interior portion thereof, said basket further comprising an overall geometric configuration substantially capable of fitting through the confines of said opening for positioning within said interior chamber.

17. An apparatus as set forth in claim 14, wherein the aqueous cleaning solution comprises a granular sodium composition of 25-70 weight percent sodium hydroxide and 5-30 weight percent sodium carbonate.

18. An apparatus as set forth in claim 14, wherein the aqueous cleaning solution comprises a concentration ratio of 1.05 pounds of granular sodium composition per one gallon of water.

19. An apparatus as set forth in claim 14, wherein the aqueous cleaning solution comprises a granular potassium composition of 25-70 weight percent potassium hydroxide and 5-30 weight percent potassium carbonate.

20. An apparatus as set forth in claim 14, wherein the aqueous cleaning solution comprises a concentration ratio of 1.05 pounds of granular potassium composition per one gallon of water.

21. An apparatus as set forth in claim 14, wherein said heating element comprises a power rating ranging from 50-300 Watts per square inch.

22. An apparatus as set forth in claim 14, wherein said plate guard comprises a geometric configuration to form an elongate opening in between said walls and base of retention tank to accommodate passage of the aqueous cleaning solution into and from said first and second compartments.

23. An apparatus as set forth in claim 14, wherein said retention tank is housed within a cabinet having an exterior panel for mounting thereon an interface controller and a start switch communicatively coupled to said microprocessor and an access panel for gaining access to said level indicator, heating element, pump, and microprocessor for repair and maintenance.

24. An apparatus as set forth in claim 14, wherein said heating element is activated for a temperature range of approximately 40° F. to a set point of 150° F.

25. An apparatus as set forth in claim 14, wherein said retention tank is fabricated from stainless steel having conductive and corrosive-resisting properties.

* * * * *